United States Patent [19]

Crown et al.

[11] 3,978,880

[45] Sept. 7, 1976

[54] REGULATOR VALVE DIAPHRAGM AND VALVE ASSEMBLY INCLUDING THE SAME

[75] Inventors: Marlyn Dale Crown; Carl Eugene Finley, both of Sycamore, Ill.

[73] Assignee: Olin Corporation, New Haven, Conn.

[22] Filed: June 23, 1975

[21] Appl. No.: 589,295

[52] U.S. Cl. .............................. 137/315; 137/454.2; 137/505.39; 137/505.42
[51] Int. Cl.² ..................................... F16K 43/00
[58] Field of Search ......... 137/454.2, 454.6, 505.38, 137/505.39, 505.41, 505.42, 315; 92/98

[56] References Cited
UNITED STATES PATENTS

| 159,108 | 1/1875 | McMillan | 137/505.41 |
| 2,160,025 | 5/1939 | Martin | 137/505.42 |
| 3,229,714 | 1/1966 | Raem | 137/505.41 |
| 3,386,469 | 6/1968 | Kelly | 137/505.38 |
| 3,566,509 | 3/1971 | Caparone | 137/505.41 X |

*Primary Examiner*—Harold W. Weakley
*Attorney, Agent, or Firm*—Donald R. Motsko; William W. Jones

[57] ABSTRACT

A diaphragm and valve assembly using the same for controlling fluid flow from a pressurized source of fluid. The diaphragm is longitudinally perforated at a peripheral area to permit axial flow of the fluid past the diaphragm, and is radially perforated to provide ambient atmospheric pressure on the downstream side of the diaphragm. The valve assembly is of the type which regulates fluid flow in response to pressure changes occurring at the fluid source which pressure changes result from ambient temperature changes thus establishing a preset fluid flow rate which persists throughout a wide range of ambient temperatures.

3 Claims, 4 Drawing Figures

REGULATOR VALVE DIAPHRAGM AND VALVE ASSEMBLY INCLUDING THE SAME

This invention relates to a fluid flow control valve assembly and a diaphragm adapted for use therewith. The valve assembly is of the type which may be preset to establish a predetermined fluid flow rate from a source of pressurized fluid, which flow rate remains substantially constant despite ambient temperature fluctuations which are operative to change the pressure in the pressurized fluid source. Valves of this type are conventionally used in connection with torches, heaters and other gaseous fueled appliances.

Valve assemblies, and diaphragms for such assemblies, which operate to provide a relatively constant flow rate of fluid from a pressurized source thereof despite ambient temperature fluctuations, the latter of which tend to cause variation in the pressure within the source of fluid are generally known in the prior art. U.S. Pat. Nos. 3,200,809, issued Aug. 17, 1965 to Walter T. Suchowolec; 3,521,669, issued July 28, 1970 to Walter T. Suchowolec; 3,557,818, issued Jan. 26, 1971 to William J. Rohde; and 3,736,093, issued May 29, 1973 to Cadet E. Bowman et al, all disclose diaphragm operated flow control valves which are illustrative of the prior art development of this type of valve.

The prior art valve assemblies of this type generally include at least a two part housing, the parts of which are secured together to form the complete housing. One of the housing parts includes a fluid inlet passage which contains a spring-biased flow control valve which is biased toward its closed position. The same housing part also includes an outlet passage downstream (in terms of fluid flow) from the flow control valve. The outlet flow passage is radially offset from the inlet flow passage and may extend parallel to the inlet flow passage for a distance, or may extend radially away from the inlet flow passage. An imperforate elastomeric diaphragm is held in place at the interface of the two housing parts and stretches across the interface to form chambers on either side of the diaphragm. The juxtaposed housing part surfaces are recessed so as to combine with the diaphragm to form these chambers, the chambers being sealed off from each other by the diaphragm. The diaphragm is spring biased against the flow control valve so that flexure of the diaphragm will result in changing the orifice size within the control valve thus varying the flow rate of fluid. The fluid pressure within the chamber on the flow path side of the diaphragm is sensed by the diaphragm and changes in this pressure which result from ambient temperature changes cause flexure of the diaphragm.

Flow control valves of the above-described type are relatively large and bulky because of the need for directing the outlet fuel passage radially away from, or back in the same direction as the inlet fuel passage, thus the housing parts must be relatively large to provide enough material for the necessary machining. This requirement prevents miniaturization of the valve assembly and results in increased weight and cost when the valve assembly is attached directly to a hand-held torch, or the like.

This invention relates to a fluid flow control valve and a diaphragm for use therewith which are generally of the above-described type but which are constructed so as to require a minimum amount of material for the housing. Thus the devices made in accordance with this invention are inexpensive, light weight, and capable of being miniaturized to a size no larger than a conventional fuel conduit or torch tip.

The crux of this invention lies in the construction of the diaphragm used in the valve assembly. The diaphragm is formed with a central imperforate portion which is preferably reinforced so as to be operative to engage and operate the fluid flow control valve. Radially outwardly around the central portion there is preferably formed a thin flexible annulus which enables the central portion to move back and forth in response to fluid pressure changes which are sensed. Radially outwardly around the flexible annulus there is formed an outer annulus which is preferably longitudinally thickened and which is provided with a first set of longitudinally extending through passages through which the controlled fluid flows, and a second set of radially extending through passages through which ambient surrounding air flows. The first and second sets of through passages are sealed off from each other. Thus a part of the fuel outlet passage from the valve assembly is formed in the diaphragm itself thus eliminating the need for a separate outlet passage in the valve housing. By placing the outlet passages in the diaphragm, the valve housing parts can be made of stamped sheet metal, at a greatly reduced cost and a greatly increased volume.

It is, therefore, an object of this invention to provide a fluid control valve assembly which provides a relatively constant fluid flow rate from a source of pressurized fluid despite ambient temperature fluctuations which vary the internal pressure within the pressurized fluid source.

It is another object of this invention to provide a valve assembly of the character described which includes a pressure sensing diaphragm having formed in the periphery thereof fluid flow passages forming a part of the fluid outlet path from the valve assembly.

It is yet another object of this invention to provide a valve assembly of the character described which can be readily miniaturized and can be formed with a valve housing made from stamped sheet metal.

These and other objects and advantages of the invention will become more readily apparent from the following detailed description of one embodiment of a valve assembly and diaphragm formed in accordance with the invention taken in conjunction with the accompanying drawings, in which:

FIG. 4 is a fragmented sectional view similar to FIG. 3 but showing the entire valve assembly mounted in a gaseous fuel burning appliance, such as a torch or the like.

Figure 1:
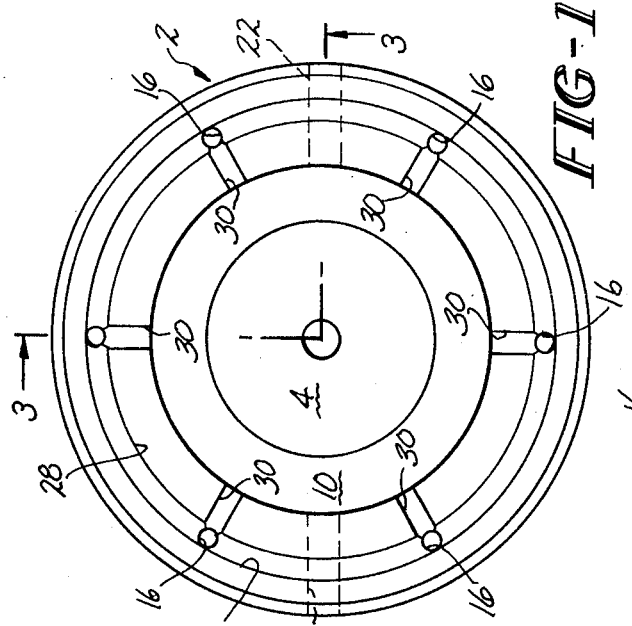
FIG. 1 is a plan view of one embodiment of a diaphragm formed in accordance with the invention showing the upstream face of the diaphragm.
Figure 2:
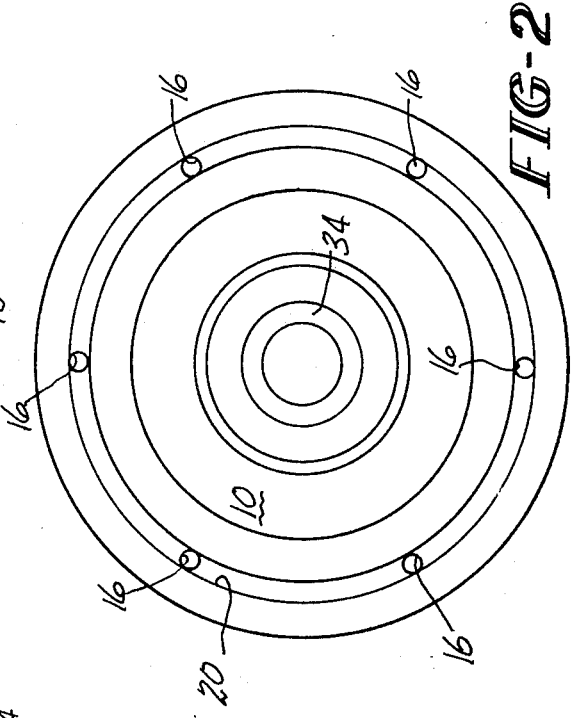
FIG. 2 is a plan view of the diaphragm of FIG. 1 but showing the downstream face thereof.
Figure 3:
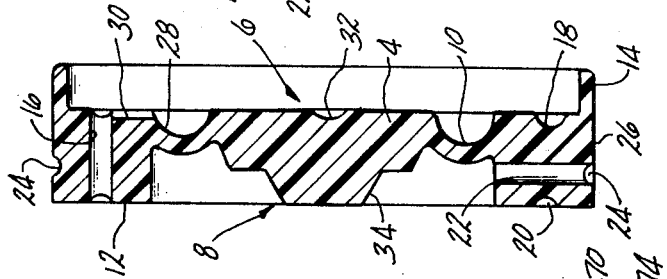
FIG. 3 is a sectional view of the diaphragm of FIG. 1 taken along line 3—3 thereof.

Referring now to FIGS. 1-3, there is shown a preferred embodiment of a valve assembly diaphragm formed in accordance with this invention. The diaphragm is identified generally by the numeral 2, is generally disc-shaped and includes a central imperforate portion 4 which is strengthened, reinforced or stiffened by being longitudinally thickened, as best shown in FIG. 3. FIG. 1 shows the upstream (in terms of direction of fluid flow) face 6 of the diaphragm and FIG. 2 shows the downstream face 8 of the diaphragm. Radially outwardly adjacent to the central portion 4, the diaphragm is formed with a flexible imperforate intermediate portion 10 which is preferably made flexible by means of thinning its longitudinal dimension, as compared to the central portion 4. The flexibility of the intermediate portion 10 permits longitudinal movement of the central portion 4 to occur in either direction in response to changes in fluid pressure acting upon the upstream face 6 of the diaphragm. The radially outermost portion 12 of the diaphragm is longitudinally thickened, as best shown in FIG. 3 and is provided with an extended flange 14 for sealing purposes which will be described in greater detail hereinafter.

The outermost portion 12 of the diaphragm is provided with a plurality of axially extending circumferentially spaced passages 16 which open into annular grooves 18 and 20 in the upstream and downstream faces 6 and 8 respectively of the diaphragm. The outermost portion 12 of the diaphragm is also provided with a plurality of radially extending circumferentially spaced passages 22 which extend between the downstream face 8 of the diaphragm and a groove 24 formed in the outermost side surface 26 of the diaphragm. It will be noted that the axial passages 16 and the radial passages 22 are offset from each other so that fluid passing through one set of passages does not pass into the other set of passages while passing through the diaphragm. It will also be noted that the flexible portion 10 of the diaphragm is formed by providing a relatively large annular groove 28 in the upstream face 6 of the diaphragm. A plurality of grooves 30 interconnect the axial passages 16 and the annular groove 28 to aid in fluid passage axially through the diaphragm. A small central recess 32 is formed in the upstream face 6 of the diaphragm to contact the stem of the valve which the diaphragm controls. The downstream face 8 of the diaphragm is preferably formed with a central frustoconical projection 34 which serves as a spring guide and retainer for a diaphragm spring, as will be explained hereinafter in greater detail.

Figure 4:
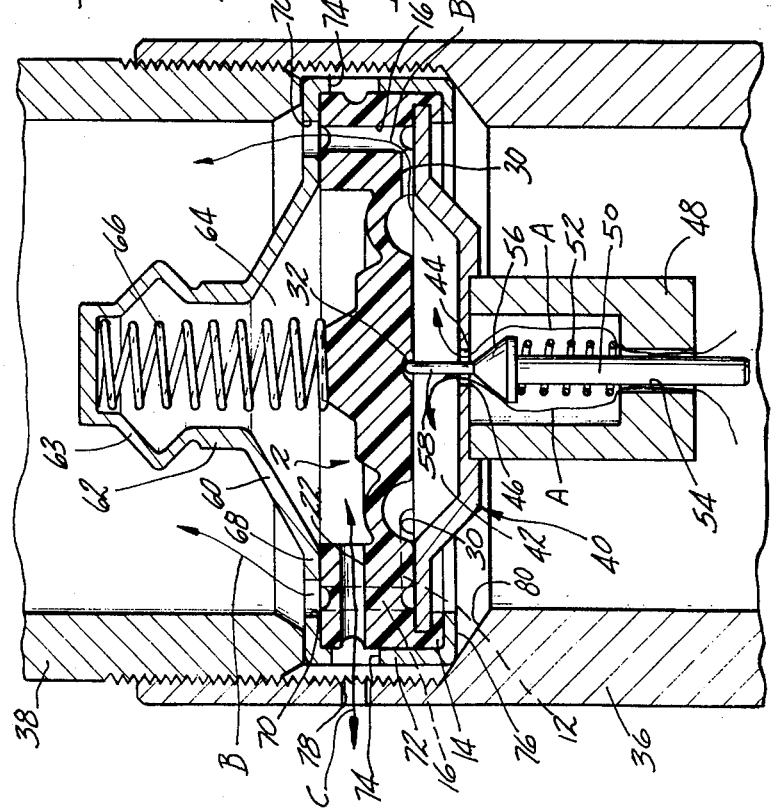

The above-described diaphragm is shown in place within a regulator assembly in a propane torch in FIG. 4. Shown fragmentarily are a fuel inlet tube 36 which is connected to a source of propane fuel under pressure (not shown) and a fuel outlet tube 38 such as a torch tip pipe. It will be noted that the outlet tube 38 is relatively small, on the order of about one-half inch in diameter, and is threaded into the inlet tube 36. It will also be noted that the regulated valve assembly fits completely inside of the two tubes 36 and 38 and that an axial flow path is maintained. The valve assembly includes a housing having a first part 40 formed from stamped sheet metal which is generally on the upstream side of the fluid flow path. The housing part 40 is dished out so as to combine with the diaphragm 2 to form a gas pressure-sensing chamber 42. An inlet opening 44 is formed in the part 40 and a valve seat 46 is formed on the edge of the opening 44. A valve housing 48, which is made of porous sintered particulate material to provide a filtering effect, contains a check valve body 50 biased in a downstream direction by a spring 52 is mounted on the housing part 40 and includes an inlet opening 54 through which gas can flow. Thus gas flows through the housing body 48 and along the path denoted by the arrows A from the inlet tube 36 into the pressure-sensing chamber 42. The valve body 50 includes a valve head 56 and a valve stem 58, the latter of which projects through the chamber 42 to engage the diaphragm recess 32.

The remainder of the regulator housing is formed by a second stamped sheet metal part 60 which is disposed, for the most part, on the downstream side of the diaphragm 2. The regulator housing part 60 includes a dome-shaped portion 62 which combines with the diaphragm 2 to form an ambient atmosphere pressure-sensing chamber 64 which houses a spring 66 engaging the diaphragm 2 to bias the latter in an upstream direction. The dome-shaped portion 62 merges outwardly into a radially extending part 68 having axially extending openings 70. The radial part 68 in turn merges into an axially extending part 72 having radial openings 74 and terminating in an inwardly turned flange 76. It will be noted that the thickened outermost part 12 of the diaphragm 2 is trapped between the two housing parts 40 and 60 and forms a seal therebetween, with the Flange 14 being curled radially inwardly and sandwiched between the housing flange 76 and the outer part of the first housing part 40. It will be noted also that the inlet tube 36 is provided with one or more radially extending ambient pressure ports 78.

As will be noted from FIG. 4, the regulator assembly may be mounted in the flow path of the device which it regulates by screwing the torch tip 38 down onto the regulator housing to force the latter down against a tapered shoulder 80 in the inlet tube 36. Thus the interiors of the inlet tube 36 and torch tip 38 are sealed from the ambient air ports 78 by the regulator housing body. Additionally the torch tip 38 seals the flow of fuel through its interior by sealing engagement with the housing part 68.

The regulator operates as follows. Once assemblied, the quantum of force exerted by the spring 66 on the diaphragm 2 is pre-set by crimping the wall 63 of the dome 62 to compress the spring 66 against the diaphragm 2, the wall 63 having been thinned out for that purpose. The diaphragm 2 thus bears against the valve stem 58 and valve spring 52 so as to open the valve to allow fluid flow from the inlet tube 36, through the regulator and into the torch tip pipe 38. The specific flow path which the gas takes through the regulator is shown by arrows A and B. Thus the gas being regulated flows into the pressure chamber 42, and thence radially outwardly and axially through the periphery of the diaphragm by way of the flow passages 30, 16, 18 and 20, and thence through the housing openings 70. Increases in pressure of the flowing gas will be sensed in the pressure chamber 42 and will cause the diaphragm 2 to flex in a downstream direction against the bias of the spring 66 to throttle down the valve opening. Similarly, the size of the valve opening will be increased when a lowering of pressure in the flowing gas is sensed in the pressure chamber 42, since the pressure within the chamber 42 and the pressure of the spring 66 act against each other to regulate flexure of the diaphragm. The ambient pressure chamber 64 is sealed from the fluid flow path by the diaphragm 2 and second housing part 60, and yet is open to the ambient surrounding atmosphere along the flow path defined by arrow C through the diaphragm's radial passages 22, the radial passages 74 in the second housing part, and the radial passages 78 in the inlet tube 36.

It will thus be readily appreciated that the diaphragm and regulator construction of this invention readily lends itself to miniaturization due to the novel flow path which it provides for the fluid whose pressure it is regulating, and for atmospheric pressure venting. The regulator assembly is applicable to any gas appliance where extremely accurate pressure regulation is not required (approximately ± 10%) and where BTU gas flow is low (less than 20,000 BTU per hour approximately). The regulator is capable of being made small enough to be incorporated directly into pre-existing flow conduits of gas torches, stoves, heaters, and similar appliances. The diaphragm is elastomeric and can easily be molded in one piece with all of its flow passages being formed in situ. The use of the novel diaphragm configuration permits the regulator housing to be made from stamped or drawn sheet metal "halves" which can be easily assembled. Thus the entire regulator is inexpensive to make and assemble and easy to install. Regulator spring pressure is preset by simply crimping the housing to compress the regulator spring against the diaphragm. The diaphragm also includes an integral spring retainer formed on its downstream face on the axis of gas flow which the device regulates.

Since many changes and variations of the disclosed embodiment of the invention may be made without departing from the inventive concept, it is not intended to limit the invention otherwise than as required by the appended claims.

What is claimed is:

1. A pressure-regulated fluid flow valve assembly comprising: in combination:
   a. a housing having at least two components formed of sheet metal;
   b. a diaphragm mounted in said housing between said components, said diaphragm dividing said housing into an upstream pressure chamber and a downstream atmospheric chamber;
   c. first means forming a plurality of longitudinally extending fluid flow passages extending from said pressure chamber through a radially outermost peripheral portion of said diaphragm and through one of said housing components;
   d. second means forming at least one radially extending atmospheric vent passage extending from said atmospheric chamber through said outermost peripheral portion of said diaphragm and through one of said housing components to the surrounding ambient atmosphere, said longitudinally extending flow passages being offset from said radially extending vent passage so as to be sealed from each other; and
   e. valve means connected to said housing and including a portion extending into said pressure chamber in contact with said diaphragm, said valve means being operative to control the flow rate of fluid into said pressure chamber in response to variations of pressure in said pressure chamber and sensed by said diaphragm.

2. The valve assembly of claim 1, further comprising spring means in said atmospheric chamber engaging said diaphragm to bias the latter toward said valve means.

3. A pressure responsive fluid flow control device comprising in combination;
   a. first means forming a fluid inlet through which fluid under pressure flows from a pressurized source thereof;
   b. second means forming a fluid outlet, said outlet and said inlet being joined together at a tightenable telescoping joint with portions of each of said inlet and outlet being coaxial with each other at least proximate to said telescoping joint, one of said first and second means being formed with an end surface which is disposed within the confines of the other of said first and second means, and the other of said first and second means being formed with a radially inwardly extending shoulder axially spaced apart from said end surface, and said first and second means combining to provide a flow path for the fluid under pressure;
   c. a valve assembly comprising:
      i. a housing;
      ii. a diaphragm mounted in said housing to divide the interior thereof into a pressure chamber and an atmospheric chamber;
      iii. means defining a fluid flow path extending from said pressure chamber through said diaphragm and said housing and opening into said fluid outlet; and
      iv. valve means mounted on the housing to provide a fluid flow path from said fluid inlet to said pressure chamber, said diaphragm being biased against said valve means to control the rate of flow of fluid therethrough from said fluid inlet to said pressure chamber in response to fluid pressure variations within said pressure chamber; and
   d. said valve assembly being disposed completely within said first and second means with said valve assembly housing being seated on said radially inwardly extending shoulder on one side and held thereagainst by said end surface being tightened against an opposite side of said valve assembly housing.

* * * * *